(No Model.)

H. BEATTY.
VAPORIZING DEVICE FOR HOT AIR REGISTERS.

No. 533,428. Patented Feb. 5, 1895.

Witnesses
E. J. Nottingham
G. F. Downing

Inventor
Henry Beatty
By Leggett & Leggett
Attorneys

UNITED STATES PATENT OFFICE.

HENRY BEATTY, OF MASSILLON, OHIO.

VAPORIZING DEVICE FOR HOT-AIR REGISTERS.

SPECIFICATION forming part of Letters Patent No. 533,428, dated February 5, 1895.

Application filed May 21, 1894. Serial No. 511,953. (No model.)

*To all whom it may concern:*

Be it known that I, HENRY BEATTY, a resident of Massillon, in the county of Stark and State of Ohio, have invented certain new and useful Improvements in Vaporizing Devices for Hot-Air Registers; and I do hereby declare the following to be a full, clear, and exact description of the invention, such as will enable others skilled in the art to which it appertains to make and use the same.

My invention relates to an improvement in vaporizing devices for hot air registers, and it consists in certain novel features of construction and combinations and arrangements of parts as hereinafter set forth and pointed out in the claims.

Figure 1:
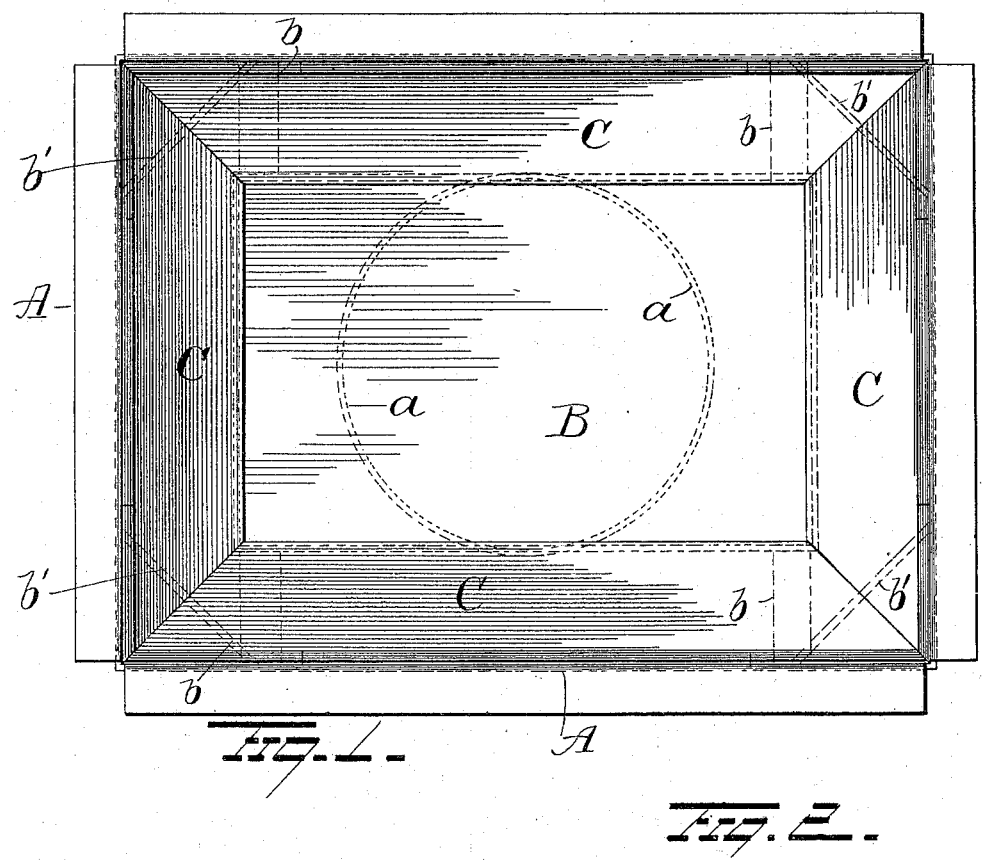
Figure 2:
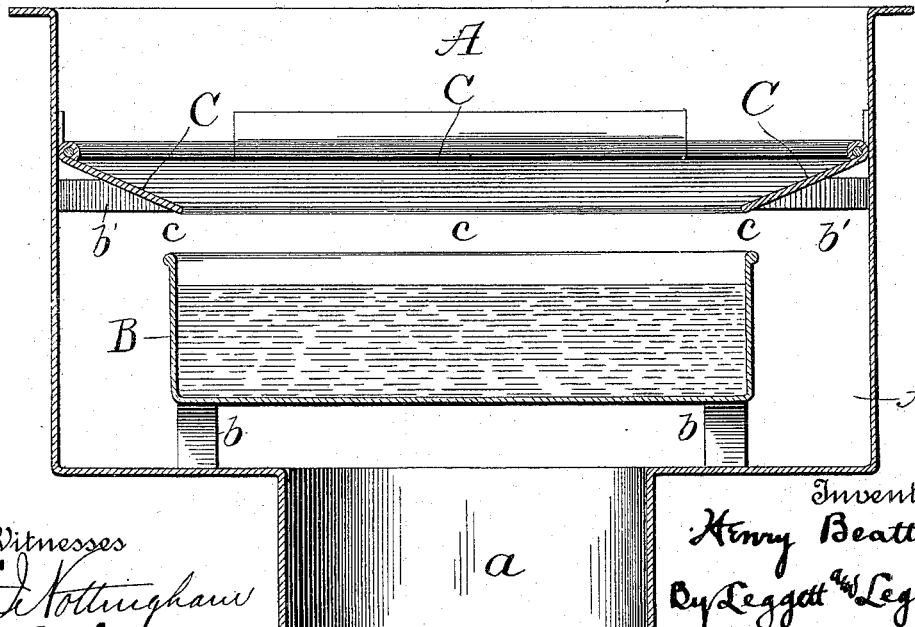

In the accompanying drawings: Figure 1 is a view illustrating my improvements. Fig. 2 is a sectional view.

A represents a register box adapted for the reception of a register to be placed in the floor of a room. This box may be made of tin or other suitable sheet metal and in its bottom is made with an opening $a$ with which a hot air pipe from a furnace or stove communicates. Within the box A, a pan B is located and intended for the reception of water, said pan being disposed over the opening $a$ and supported a suitable distance above the same by means of legs or supports $b$ which project downwardly and laterally from the pan and rest on the bottom of the box at the point of junction therewith of the sides of the box, thus preventing any lateral movement of the pan. Above the pan B deflectors or wings C are hinged to the inner faces of the sides and ends of the register box and are normally supported in an inclined position by means of bars $b'$ extending across the corners of the box, said bars also constituting braces for the box. When in their normal positions the inner edges of the deflectors are practically in line with the sides and ends of the pan B and are disposed a short distance above them, so as to leave spaces or passages $c$ between the sides and ends of the pan and said deflectors. From this construction and arrangement of parts it will be seen that the hot air entering box A through the opening $a$ will first meet the pan B and heat the water contained therein, and will then flow around the sides and ends of the pan, and, by the deflectors C, will be made to pass through the spaces or passages $c$ and pass over the pan, commingling with the vapor arising from the water in said pan. The heated air, when it reaches the room in which the register is located will therefore, not be dry, but will be charged with a proper amount of moisture, which is very desirable.

The deflectors not only serve to deflect the air, but also constitute guards to prevent the collection of dust and dirt in the bottom of the box A, and they also serve to direct water into the pan, the water being poured into the pan through the register. By hinging said deflectors or wings, the pan B can be readily removed, and the box can be readily cleaned should dust and dirt find their way thereinto.

My improvements are very simple in construction, cheap to manufacture and effectual, in all respects, in the performance of their functions.

It is evident that my improvements are not only applicable to floor registers, but that they may also be applied to a vertical register or at any point in a hot air pipe desired.

Slight changes might be made in the details of construction of my invention without departing from the spirit thereof or limiting its scope and hence I do not wish to limit myself to the precise details of construction herein set forth, but, Having fully described my invention, what I claim as new, and desire to secure by Letters Patent, is—

1. The combination with a register box having an opening for the hot air, of a water pan located directly above said opening and sufficiently removed therefrom to leave a space for the passage of the heated air beneath and around the sides of the pan, and deflectors permanently hinged within the box over the space between the pan and the wall of the box and sufficiently removed from the pan to allow the heated air to pass between the pan and deflector, substantially as set forth.

2. The combination with a register box, of a water pan therein removable through the top of the box, an upwardly movable deflector permanently located inside of the box and adapted to span the space between the box and the pan, substantially as set forth.

In testimony whereof I have signed this specification in the presence of two subscribing witnesses.

HENRY BEATTY.

Witnesses:
W. M. NEWSLETTER,
WM. MCMILLAN.